(12) United States Patent
More et al.

(10) Patent No.: US 9,473,512 B2
(45) Date of Patent: Oct. 18, 2016

(54) METHODS AND SYSTEMS TO IMPLEMENT FINGERPRINT LOOKUPS ACROSS REMOTE AGENTS

(75) Inventors: Scott More, Tokyo (JP); Ilya Beyer, San Mateo, CA (US); Daniel Christopher John Sweeting, Hornchurch (GB)

(73) Assignee: Workshare Technology, Inc., San Francisco, CA (US)

( * ) Notice: Subject to any disclaimer, the term of this patent is extended or adjusted under 35 U.S.C. 154(b) by 495 days.

(21) Appl. No.: 12/209,096

(22) Filed: Sep. 11, 2008

(65) Prior Publication Data

US 2010/0064372 A1    Mar. 11, 2010

(51) Int. Cl.
G06F 7/04 (2006.01)
H04L 29/06 (2006.01)
G06F 21/55 (2013.01)

(52) U.S. Cl.
CPC .......... *H04L 63/12* (2013.01); *G06F 21/554* (2013.01); *H04L 63/1408* (2013.01)

(58) Field of Classification Search
USPC .......................................................... 726/26
See application file for complete search history.

(56) References Cited

U.S. PATENT DOCUMENTS

| | | | |
|---|---|---|---|
| 4,479,195 A | 10/1984 | Herr et al. | |
| 4,853,961 A | 8/1989 | Pastor | |
| 4,949,300 A | 8/1990 | Christenson et al. | |
| 5,008,853 A | 4/1991 | Bly et al. | |
| 5,072,412 A | 12/1991 | Henderson, Jr. et al. | |
| 5,220,657 A | 6/1993 | Bly et al. | |
| 5,245,553 A | 9/1993 | Tanenbaum | |
| 5,247,615 A | 9/1993 | Mori et al. | |
| 5,293,619 A | 3/1994 | Dean | |
| 5,315,504 A | 5/1994 | Lemble | |
| 5,379,374 A | 1/1995 | Ishizaki et al. | |
| 5,446,842 A | 8/1995 | Schaeffer et al. | |

(Continued)

FOREIGN PATENT DOCUMENTS

| JP | 10177650 A | 6/1998 |
|---|---|---|
| JP | 2004265267 A | 9/2004 |

(Continued)

OTHER PUBLICATIONS

International Search Report of PCT Application No. PCT/US2009/064919 dated Jul. 1, 2010, pp. 1-3.

(Continued)

*Primary Examiner* — Dante Ravetti
(74) *Attorney, Agent, or Firm* — Ted Sabety; Sabety + associates, PLLC

(57) ABSTRACT

The present invention provides methods and systems to protect an organization's secure information from unauthorized disclosure. The present system uses protect agents installed across various egress points (e.g., email server, user's computer, etc.) to monitor information disclosed by a user. The present system also provides the use of fingerprint servers to remotely maintain a database of fingerprints associated with the organization's secure data. In one embodiment, the protect agents transmit fingerprints associated with the user's information to the fingerprint server utilizing a local network or the public internet. The protect agents then receive a comparison analysis from the fingerprint servers and execute appropriate security action based on the analysis. In one embodiment, a combination of the local network and public internet is utilized to achieve remote agent lookups.

26 Claims, 4 Drawing Sheets

(56) References Cited

U.S. PATENT DOCUMENTS

| | | |
|---|---|---|
| 5,608,872 A | 3/1997 | Schwartz et al. |
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,673,316 A | 9/1997 | Auerbach et al. |
| 5,699,427 A | 12/1997 | Chow et al. |
| 5,745,879 A | 4/1998 | Wyman |
| 5,751,814 A | 5/1998 | Kafri |
| RE35,861 E | 7/1998 | Queen |
| 5,787,175 A | 7/1998 | Carter |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,850,219 A | 12/1998 | Kumomura |
| 5,874,953 A | 2/1999 | Webster et al. |
| 5,890,176 A | 3/1999 | Kish et al. |
| 5,890,177 A | 3/1999 | Moody et al. |
| 5,898,836 A | 4/1999 | Freivald et al. |
| 6,003,060 A | 12/1999 | Aznar et al. |
| 6,009,173 A | 12/1999 | Sumner |
| 6,012,087 A | 1/2000 | Freivald et al. |
| 6,049,804 A | 4/2000 | Burgess et al. |
| 6,067,551 A | 5/2000 | Brown et al. |
| 6,088,702 A | 7/2000 | Plantz et al. |
| 6,145,084 A | 11/2000 | Zuili et al. |
| 6,169,976 B1 | 1/2001 | Colosso |
| 6,189,019 B1 | 2/2001 | Blumer et al. |
| 6,189,146 B1 | 2/2001 | Misra et al. |
| 6,212,534 B1 | 4/2001 | Lo et al. |
| 6,216,112 B1 | 4/2001 | Fuller et al. |
| 6,219,652 B1 | 4/2001 | Carter et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,321,265 B1 | 11/2001 | Najork et al. |
| 6,327,611 B1 | 12/2001 | Everingham |
| 6,336,123 B2 | 1/2002 | Inoue et al. |
| 6,351,755 B1 | 2/2002 | Najork et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 | 7/2003 | Britton |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,738,762 B1 | 5/2004 | Chen et al. |
| 6,918,082 B1 | 7/2005 | Gross |
| 7,035,427 B2 | 4/2006 | Rhoads |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,212,955 B2 | 5/2007 | Kirshenbau et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 | 1/2008 | Gendler |
| 7,353,455 B2 | 4/2008 | Malik |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield |
| 7,564,997 B2 | 7/2009 | Hamid |
| 7,613,770 B2 | 11/2009 | Li |
| 7,624,447 B1 * | 11/2009 | Horowitz et al. .............. 726/23 |
| 7,627,613 B1 | 12/2009 | Dulitz et al. |
| 7,673,324 B2 | 3/2010 | Tirosh et al. |
| 7,680,785 B2 | 3/2010 | Najork |
| 7,694,336 B2 | 4/2010 | Rinkevich et al. |
| 7,720,256 B2 | 5/2010 | Desprez et al. |
| 7,730,175 B1 | 6/2010 | Roesch et al. |
| 7,788,235 B1 | 8/2010 | Yeo |
| 7,796,309 B2 | 9/2010 | Sadovsky et al. |
| 7,818,678 B2 | 10/2010 | Massand |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,895,276 B2 | 2/2011 | Massand |
| 7,903,822 B1 | 3/2011 | Hair et al. |
| 7,941,844 B2 | 5/2011 | Anno |
| 7,991,751 B2 | 8/2011 | Peled |
| 8,005,277 B2 | 8/2011 | Tulyakov et al. |
| 8,042,112 B1 | 10/2011 | Zhu et al. |
| 8,060,575 B2 | 11/2011 | Massand |
| 8,140,513 B2 | 3/2012 | Ghods et al. |
| 8,181,036 B1 | 5/2012 | Nachenberg |
| 8,196,030 B1 | 6/2012 | Wang et al. |
| 8,201,254 B1 | 6/2012 | Wilhelm et al. |
| 8,233,723 B2 | 7/2012 | Sundaresan |
| 8,286,085 B1 | 10/2012 | Denise |
| 8,286,171 B2 | 10/2012 | More et al. |
| 8,326,814 B2 | 12/2012 | Ghods |
| 8,381,104 B2 | 2/2013 | Massand |
| 8,406,456 B2 | 3/2013 | More |
| 8,471,781 B2 | 6/2013 | Massand |
| 8,473,847 B2 | 6/2013 | Glover |
| 8,478,995 B2 | 7/2013 | Alculumbre |
| 8,555,080 B2 | 10/2013 | More et al. |
| 8,620,020 B2 | 12/2013 | More |
| 8,635,295 B2 | 1/2014 | Mulder |
| 8,670,600 B2 | 3/2014 | More |
| 8,839,100 B1 | 9/2014 | Orofino, II |
| 8,977,697 B2 | 3/2015 | Massand |
| 2001/0042073 A1 | 11/2001 | Saether et al. |
| 2002/0010682 A1 | 1/2002 | Johnson |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 * | 9/2002 | Schleicher .............. H04L 63/12 713/187 |
| 2002/0159239 A1 * | 10/2002 | Amie et al. ................... 361/737 |
| 2002/0164058 A1 | 11/2002 | Aggarwal et al. |
| 2003/0009518 A1 | 1/2003 | Harrow et al. |
| 2003/0037010 A1 | 2/2003 | Schmelzer |
| 2003/0046572 A1 | 3/2003 | Newman et al. |
| 2003/0046639 A1 | 3/2003 | Fai et al. |
| 2003/0061260 A1 | 3/2003 | Rajkumar |
| 2003/0093755 A1 | 5/2003 | Ramakrishnan |
| 2003/0097454 A1 | 5/2003 | Yamakawa et al. |
| 2003/0112273 A1 | 6/2003 | Hadfield et al. |
| 2003/0115273 A1 | 6/2003 | Delia et al. |
| 2003/0121008 A1 | 6/2003 | Tischer |
| 2003/0131005 A1 | 7/2003 | Berry |
| 2003/0147267 A1 | 8/2003 | Huttunen |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |

(56) References Cited

U.S. PATENT DOCUMENTS

| | | |
|---|---|---|
| 2003/0233419 A1 | 12/2003 | Beringer |
| 2004/0002049 A1 | 1/2004 | Beavers et al. |
| 2004/0122659 A1 | 6/2004 | Hourihane et al. |
| 2004/0186851 A1 | 9/2004 | Jhingan et al. |
| 2004/0187076 A1 | 9/2004 | Ki |
| 2004/0261016 A1 | 12/2004 | Glass et al. |
| 2005/0021637 A1 | 1/2005 | Cox |
| 2005/0027704 A1 | 2/2005 | Hammond et al. |
| 2005/0055306 A1 | 3/2005 | Miller et al. |
| 2005/0086525 A1 | 4/2005 | Cirulli et al. |
| 2005/0123137 A1 | 6/2005 | McCallum |
| 2005/0138540 A1 | 6/2005 | Baltus et al. |
| 2005/0251748 A1 | 11/2005 | Gusmorino et al. |
| 2005/0268327 A1 | 12/2005 | Starikov |
| 2006/0005247 A1* | 1/2006 | Zhang ............... G06F 17/30616 726/26 |
| 2006/0013393 A1 | 1/2006 | Ferchichi et al. |
| 2006/0020520 A1 | 1/2006 | Lange et al. |
| 2006/0021031 A1 | 1/2006 | Leahy et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069605 A1 | 3/2006 | Hatoun |
| 2006/0069740 A1 | 3/2006 | Ando |
| 2006/0098850 A1 | 5/2006 | Hamid |
| 2006/0112120 A1 | 5/2006 | Rohall |
| 2006/0129592 A1 | 6/2006 | Poozhiyil et al. |
| 2006/0129627 A1 | 6/2006 | Phillips |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0259524 A1 | 11/2006 | Horton |
| 2006/0259949 A1 | 11/2006 | Schaefer et al. |
| 2006/0261112 A1 | 11/2006 | Gates et al. |
| 2006/0271947 A1* | 11/2006 | Lienhart et al. ................ 725/19 |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves |
| 2007/0025265 A1 | 2/2007 | Porras et al. |
| 2007/0027830 A1 | 2/2007 | Simons et al. |
| 2007/0100991 A1 | 5/2007 | Daniels et al. |
| 2007/0101154 A1 | 5/2007 | Bardsley et al. |
| 2007/0101413 A1 | 5/2007 | Vishik et al. |
| 2007/0112854 A1 | 5/2007 | Franca |
| 2007/0112930 A1 | 5/2007 | Foo et al. |
| 2007/0118598 A1 | 5/2007 | Bedi et al. |
| 2007/0141641 A1 | 6/2007 | Fang |
| 2007/0156785 A1 | 7/2007 | Hines et al. |
| 2007/0192728 A1 | 8/2007 | Finley et al. |
| 2007/0220068 A1 | 9/2007 | Thompson et al. |
| 2007/0253608 A1 | 11/2007 | Tulyakov et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2008/0028017 A1 | 1/2008 | Garbow et al. |
| 2008/0033913 A1 | 2/2008 | Winburn |
| 2008/0040388 A1 | 2/2008 | Petri et al. |
| 2008/0046518 A1 | 2/2008 | Tonnison et al. |
| 2008/0080515 A1* | 4/2008 | Tombroff et al. ............. 370/394 |
| 2008/0082529 A1 | 4/2008 | Mantena et al. |
| 2008/0082930 A1 | 4/2008 | Omernick et al. |
| 2008/0094370 A1 | 4/2008 | Ording et al. |
| 2008/0178076 A1 | 7/2008 | Kritt et al. |
| 2008/0209001 A1 | 8/2008 | Boyle et al. |
| 2008/0219495 A1 | 9/2008 | Hulten et al. |
| 2008/0235760 A1 | 9/2008 | Broussard |
| 2008/0263363 A1 | 10/2008 | Jueneman et al. |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0019051 A1 | 1/2009 | Winburn |
| 2009/0030997 A1 | 1/2009 | Malik |
| 2009/0034804 A1* | 2/2009 | Cho et al. .................... 382/116 |
| 2009/0037520 A1 | 2/2009 | Loffredo |
| 2009/0052778 A1 | 2/2009 | Edgecomb et al. |
| 2009/0064326 A1 | 3/2009 | Goldstein |
| 2009/0070128 A1 | 3/2009 | McCauley et al. |
| 2009/0083384 A1 | 3/2009 | Bhogal et al. |
| 2009/0094530 A1 | 4/2009 | Champlain et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0216843 A1 | 8/2009 | Willner et al. |
| 2009/0222450 A1 | 9/2009 | Zigelman |
| 2009/0234863 A1 | 9/2009 | Evans |
| 2009/0235706 A1 | 9/2009 | Broussard et al. |
| 2009/0241187 A1 | 9/2009 | Troyansky |
| 2009/0271620 A1 | 10/2009 | Sudhakar |
| 2010/0011077 A1 | 1/2010 | Shkolnikov et al. |
| 2010/0017404 A1 | 1/2010 | Banerjee et al. |
| 2010/0017478 A1 | 1/2010 | Mejia et al. |
| 2010/0017850 A1 | 1/2010 | More et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0114985 A1 | 5/2010 | Chaudhary et al. |
| 2010/0114991 A1 | 5/2010 | Chaudhary et al. |
| 2010/0124354 A1 | 5/2010 | More |
| 2010/0174761 A1 | 7/2010 | Longobardi et al. |
| 2010/0217987 A1 | 8/2010 | Shevade |
| 2010/0251104 A1 | 9/2010 | Massand |
| 2010/0257352 A1 | 10/2010 | Errico |
| 2010/0287246 A1 | 11/2010 | Klos et al. |
| 2010/0299727 A1 | 11/2010 | More et al. |
| 2010/0332682 A1 | 12/2010 | Sharp et al. |
| 2011/0029625 A1 | 2/2011 | Cheng et al. |
| 2011/0107106 A1 | 5/2011 | Morii et al. |
| 2011/0141521 A1 | 6/2011 | Qiao |
| 2011/0145229 A1 | 6/2011 | Vailaya et al. |
| 2011/0154180 A1 | 6/2011 | Evanitsky et al. |
| 2011/0276658 A1 | 11/2011 | Massand |
| 2011/0283177 A1 | 11/2011 | Gates et al. |
| 2012/0011361 A1 | 1/2012 | Guerrero et al. |
| 2012/0016867 A1 | 1/2012 | Clemm et al. |
| 2012/0110092 A1 | 5/2012 | Keohane et al. |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0136952 A1 | 5/2012 | Mulder |
| 2012/0173881 A1 | 7/2012 | Trotter |
| 2012/0265817 A1 | 10/2012 | Vidalenc et al. |
| 2012/0317414 A1 | 12/2012 | Glover |
| 2012/0317479 A1 | 12/2012 | Safa |
| 2012/0324369 A1 | 12/2012 | Safa |
| 2013/0074195 A1 | 3/2013 | Johnston et al. |
| 2013/0074198 A1 | 3/2013 | More |
| 2013/0097421 A1 | 4/2013 | Lim |
| 2013/0246901 A1 | 9/2013 | Massand |
| 2013/0254536 A1 | 9/2013 | Glover |
| 2013/0290867 A1 | 10/2013 | Massand |
| 2014/0115066 A1 | 4/2014 | Massand |
| 2014/0281872 A1 | 9/2014 | Glover |
| 2015/0033283 A1 | 1/2015 | Mulder |

FOREIGN PATENT DOCUMENTS

| | | |
|---|---|---|
| JP | 2007299364 A | 11/2007 |
| KR | 1020010078840 | 8/2001 |
| KR | 20040047413 A | 6/2004 |
| KR | 1020060048686 | 5/2006 |
| KR | 20070049518 A | 5/2007 |
| KR | 1020080029602 | 4/2008 |
| WO | 0060504 | 10/2000 |
| WO | WO-0060504 A1 | 10/2000 |

(56) References Cited

FOREIGN PATENT DOCUMENTS

| WO | 0152473 | 7/2001 |
|---|---|---|
| WO | 2010030871 | 3/2010 |

OTHER PUBLICATIONS

Written Opinion PCT Application No. PCT/US2009/064919 dated Jul. 1, 2010, pp. 1-4.
Written Opinion PCT Application No. PCT/US2009/056651, Dated Apr. 21, 2010, pp. 1-5.
International Search Report of PCT Application No. PCT/US2009/056668 dated Apr. 16, 2010, pp. 1-9.
Written Opinion PCT Application No. PCT/US2009/056668 dated Apr. 16, 2010, pp. 1-4.
PC Magazine "Pure Intranets: Real-TIme Internet Collaboration", http://www.zdnet.com/pcmag/featuresgroupware/gpwst.htm, Aug. 30, 2001, 2 pages.
Wells et al., "Groupware & Collaboration Support", www.objs.com/survey/groupwar.htm, Aug. 30, 2001, 10 pages.
Tsai, et al., "A Document Workspace for Collaboration and Annotation based on XML Technology", IEEE, 2000, pp. 165-172.
Roussev, et al., "Integrating XML and Object-based Programming for Distributed Collaboration", IEEE, 2000, pp. 254-259.
XP-002257904, "Workshare Debuts Synergy", 2003, 3 pages.
Microsoft, "Microsoft XP, Product Guide", pp. 1-26.
International Search Report of PCT Application No. PCT/IB2002/005821, Jan. 30, 2004, 6 pages.
International Search Report of PCT Application No. PCT/US2009/051313, Mar. 3, 2010, 3 pages.
Co-pending U.S. Appl. No. 10/136,733, filed Apr. 30, 2002.
Co-pending U.S. Appl. No. 10/023,010, filed Dec. 17, 2001.
Non-Final Office Action Mailed May 7, 2008 in Co-pending U.S. Appl. No. 10/023,010, filed Dec. 17, 2001.
Weiss et al., Lightweight document matching for help-desk applications, In: Intelligent Systems and their Applications, IEEE, Vo. 15, Issue:2, pp. 57-61, ISSN 1094-7167, 2000.
International Search Report of PCT Application No. PCT/US2009/065019 dated Jun. 4, 2010, pp. 1-6.
Written Opinion PCT Application No. PCT/US2009/065019 dated Jun. 4, 2010 pp. 1-5.
Final Office Action Mailed Oct. 21, 2013, in Co-Pending U.S. Appl. No. 13/659,793 by More, S., filed Oct. 24, 2012.
Advisory Action Mailed Nov. 1, 2013, in Co-Pending U.S. Appl. No. 13/659,793 by More, S., filed Oct. 24, 2012.
Cox et al; Microsoft Office Word 2007 Step by Step; Jan. 17, 2007; Microsoft Press; pp. 283-293.
Prinz, Wolfgang, and Sabine Kolvenbach. "Support for workflows in a ministerial environment." Computer Supported Cooperative Work: Proceedings of the 1996 ACM conference on Computer supported cooperative work, vol. 16, No. 20, 1996; pp. 2-4, 8.
Howard, Pamela O. Prototype Message Dissemination System and Document Routing System for an Army Organization. Arizona Univ Tucson, 1990; pp. 7-9.
Stephen Voida et al., Share and Share Alike: Exploring the User Interface Affordances of File Sharing, Apr. 22-27, 2006, ACM, pp. 1-10.
Dominik Grolmund et al., Cryptree: A Folder Tree Structure for Cryptographic File Systems, Oct. 2-4, 2006, IEEE, pp. 189-198.
Nathanial S. Good et al., Usability and privacy: a study of KaZaA P2P file-sharing, Apr. 5-10 2003, ACM, vol. No. 5, Issue No. 1, pp. 137-144.
M. Eric Johnson et al., The Evolution of the Peer-to-Peer File Sharing Industry and the Security Risks for Users, Jan. 7-10, 2008, IEEE, pp. 1-10.
International Search Report of PCT Application No. PCT/US2009/056651, Dated Apr. 21, 2010, pp. 1-3.
Written Opinion of PCT Application No. PCT/US2009/051313, Mar. 3, 2010, 4 pages.
Written Opinion PCT Application No. PCT/US2010/043345 dated Apr. 28, 2011, 4 pages.
Restriction Requirement Mailed Jun. 30, 2006 for U.S. Appl. No. 10/136,733, filed Apr. 30, 2002.
Notice of Allowance Mailed Oct. 24, 2008 in Co-pending U.S. Appl. No. 10/023,010, filed Dec. 17, 2001.
Non-Final Office Action mailed Dec. 6, 2012 in co-pending U.S. Appl. No. 13/306,798, filed Nov. 29, 2011.
Non-Final Office Action mailed Aug. 13, 2013 in co-pending U.S. Appl. No. 13/306,819 by Glover, R.W., filed Nov. 29, 2011.
Non-Final Office Action mailed May 17, 2013 in co-pending U.S. Appl. No. 13/306,765 by Mulder, S. P.M, filed Nov. 29, 2011.
Non-Final Office Action Mailed Mar. 20, 2006 in Co-pending U.S. Appl. No. 10/136,733, filed Apr. 30, 2002.
Non-final office action issued for U.S. Appl. No. 13/799,067 on Oct. 30, 2014.
Final Office Action mailed Aug. 16, 2013 in co-pending U.S. Appl. No. 13/306,798 of Glover, R.W., filed Nov. 29, 2011.
Notice of Allowance Mailed Jul. 8, 2013 in Co-Pending U.S. Appl. No. 12/209,082 by S. More et al., filed Sep. 11, 2008.
Notice of Allowance Mailed Oct. 2, 2012, in Co-Pending U.S. Appl. No. 12/275,185 by More, S., filed Nov. 20, 2008.
Final Office Action Mailed Feb. 1, 2013 in Co-Pending U.S. Appl. No. 12/621,429 by More, S., filed Nov. 18, 2009.
Advisory Action mailed Apr. 12, 2013, in Co-Pending U.S. Appl. No. 12/621,429 by More, S., filed Nov. 18, 2009.
Non-Final Office Action Mailed Sep. 19, 2012 in Co-Pending U.S. Appl. No. 12/844,818 by Glover, R., filed Jul. 27, 2010.
Final Office Attion Mailed Jan. 18, 2013 in Co-Pending U.S. Appl. No. 12/844,818 by Glover, R., filed Jul. 27, 2010.
Notice of Allowance Mailed Mar. 13, 2013 in Co-Pending U.S. Appl. No. 12/844,818 by Glover, R., filed Jul. 27, 2010.
Non-Final Office Action Mailed Mar. 18, 2013 in Co-Pending U.S. Appl. No. 13/659,793 by More, S., filed Oct. 24, 2012.
Non-Final Office Action Mailed Apr. 26, 2013 in Co-Pending U.S. Appl. No. 13/659,817 by More, S., filed Oct. 24, 2012.
Notice of Allowance Mailed Sep. 25, 2013, in Co-Pending U.S. Appl. No. 13/659,817 by More, S., filed Oct. 24, 2012.
Monga, et al., "Perceptual Image Hashing Via Feature Points: Performance Evaluation and Tradeoffs," IEEE Transactions on Image Processing, vol. 15, No. 11, Nov. 2006.
Monga, "Robust Perceptual Image Hashing Using Feature Points," http://bluecoat-02/?cfru=aHR0cDovL3NpZ25hbC51Y2UudXRle GFzLmVkdS9+dmlzaGFsL2hhc2gtcGFydEkucHM=, 2003.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Xuefeng Liang; et al., "Fingerprint Matching Using Minutia Polygons," Pattern Recognition, 2006, ICPR 2006, 18th International Conference on, vol. 1, No., pp. 1046-1049.
Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.
Yung, et al., "Generating Robust Digital Signature for Image/Video Authentication," Multimedia and Security Workshop at ACM Multimedia '98, Bristol, U.K., Sep. 1998.
Non-Final Office Action Mailed Aug. 1, 2012 in Co-Pending U.S. Appl. No. 12/621,429, filed Nov. 18, 2009.
Notice of Allowance Mailed Aug. 19, 2012 in Co-Pending U.S. Appl. No. 12/177,043, filed Jul. 21, 2008.
Final Office Action Mailed May 10, 2012 in Co-Pending U.S. Appl. No. 12/209,082, filed Sep. 11, 2008.
Non-Final Office Action Mailed Apr. 27, 2012 in Co-Pending U.S. Appl. No. 12/275,185, filed Nov. 20, 2008.
Notice of Allowance Mailed Jun. 26, 2012 in Co-Pending U.S. Appl. No. 12/275,185, filed Nov. 20, 2008.
Co-pending U.S. Appl. No. 13/620,364, filed Sep. 14, 2012.
Co-Pending U.S. Appl. No. 13/659,793, filed Oct. 24, 2012.
Co-Pending U.S. Appl. No. 13/659,817, filed Oct. 24, 2012.
Co-pending U.S. Appl. No. 12/621,429, filed Nov. 18, 2009.
Co-pending U.S. Appl. No. 12/177,043, filed Jul. 21, 2008.

(56) References Cited

OTHER PUBLICATIONS

Co-pending U.S. Appl. No. 12/209,082, filed Sep. 11, 2008.
Co-pending U.S. Appl. No. 12/275,185, filed Nov. 20, 2008.
Co-pending U.S. Appl. No. 12/844,818, filed Jul. 27, 2010.
Final Office Action Mailed Apr. 17, 2007 for U.S. Appl. No. 10/023,010, filed Dec. 17, 2001, Issued U.S. Pat. No. 7,496,841.
International Search Report of PCT Application No. PCT/US2010/043345, Apr. 28, 2011, 3 pages.
Non-Final Office Action Mailed Mar. 16, 2006 for U.S. Appl. No. 10/023,010, filed Dec. 17, 2001, Issued U.S. Pat. No. 7,496,841.
Non-Final Office Action Mailed Sep. 19, 2011 for U.S. Appl. No. 12/177,043, filed Jul. 21, 2008.
Restriction Requirement Mailed Feb. 14, 2005 for U.S. Appl. No. 10/023,010, filed Dec. 17, 2001, Issued U.S. Pat. No. 7,496,841.
Restriction Requirement Mailed Feb. 5, 2008 for U.S. Appl. No. 10/023,010, filed Dec. 17, 2001, Issued U.S. Pat. No. 7,496,841.
Non-Final Office Action Mailed Dec. 22, 2011 in Co-Pending U.S. Appl. No. 12/209,082.
Non-Final Office Action Mailed Jan. 9, 2012 in Co-Pending U.S. Appl. No. 12/177,043, filed Jul. 21, 2008.

* cited by examiner

METHODS AND SYSTEMS TO IMPLEMENT FINGERPRINT LOOKUPS ACROSS REMOTE AGENTS

CROSS-REFERENCE TO RELATED APPLICATIONS

This application is related to U.S. application Ser. No. 12/177,043 filed Jul. 21, 2008, which is incorporated by reference as if fully set forth herein. This application is also related to applicants' co-pending application filed Sep. 11, 2008 entitled "Methods And Systems For Protect Agents Using Distributed Lightweight Fingerprints,".

FIELD OF INVENTION

The present invention relates to information security and more specifically it relates to systems and methods for detecting and preventing unauthorized disclosure of secure information. Furthermore, the present invention pertains to implementing fingerprint lookups across remote agents connected to a network.

BACKGROUND OF THE INVENTION

With the rapid increase and advances in digital documentation services and document management systems, organizations are increasingly storing important, confidential, and secure information in the form of digital documents. Unauthorized dissemination of this information, either by accident or by wanton means, presents serious security risks to these organizations. Therefore, it is imperative for the organizations to protect such secure information and detect and react to any secure information (or derivatives thereof) from being disclosed beyond the perimeters of the organization.

Additionally, the organizations face the challenge of categorizing and maintaining the large corpus of digital information across potentially thousands of data stores, content management systems, end-user desktops, etc. One solution to this challenge is to generate fingerprints from all of the digital information that the organization seeks to protect. These fingerprints tersely and securely represent the organization's secure data, and can be maintained in a database for later verification against the information that a user desires to disclose. When the user wishes to disclose any information outside of the organization, fingerprints are generated for the user's information, and these fingerprints are compared against the fingerprints stored in the fingerprint database. If the fingerprints of the user's information matches with fingerprints contained in the fingerprint server, suitable security actions are performed.

However, the user has at his disposal myriad options to disclose the information outside of the organization's protected environment. For example, the user could copy the digital information from his computer to a removable storage medium (e.g., a floppy drive, a USB storage device, etc.), or the user could email the information from his computer through the organization's email server, or the user could print out the information by sending a print request through the organization's print server, etc. Therefore, it is imperative to monitor the user's activity through each of these egress points.

In order to effectively protect the organization's secure information, the information that is transmitted through any of the organization's egress points needs to be converted to fingerprints and compared against the fingerprints contained in the organization's fingerprint database. One way of achieving this would be by replicating and maintaining a plurality of fingerprint database at the locations containing egress points (e.g., at the print server, at the email server, at the user's desktop computer, etc.). This can be achieved by means of database replication, agent polling, diff sync pushes from a central fingerprint server, etc.

However, most organizations have several desktop computers and maintain arrays of systems that represent a large number of egress points. With the increase in the number of egress points, the number of individual fingerprint databases that need to be created, maintained, and refreshed periodically becomes prohibitively large. In addition, the fingerprints in the fingerprint database may also contain additional metadata (e.g., to indicate the location of the fingerprint within a document, to indicate the origin information of the document, etc.), further increasing the size of the individual fingerprint databases, thus further exacerbating the cost and difficulties associated with maintaining a plethora of individual fingerprint databases.

Other solutions exist in the prior art to protect digital information in such porous environments. These solutions include encrypting the files, or applying digital rights management or watermarks directly to the files. These solutions do not typically employ the method of fingerprint lookups, and therefore do not require fingerprint databases to be maintained. However, they present other disadvantages. For example, the digital information itself needs to be converted, and unprotected versions of the information needs to be identified and managed (or destroyed) to ensure the security of the information. Additionally, the presence of the watermarking or the digital rights management information does not preclude the information from being disclosed outside of the organization. In most cases, the watermarks only serve as a security awareness or deterrent feature and do not actually prevent the information from being disclosed.

SUMMARY OF THE INVENTION

Methods and systems to provide efficient means to monitor and protect an organization's secure information using remote agent lookups is provided. In one embodiment, the present invention provides methods and systems to implement a protect agent across various egress points of an organization's computing environment. Examples of egress points include a printer or a removable storage device (e.g., a USB flash memory drive, CD drive, etc.) connected to a user's desktop computer through which the user could potentially transmit secure information outside of the organization's protected environment. The protect agents monitor activity across all egress points, and receive any information that a user intends to disclose through the egress points.

In one embodiment, the protect agents generate fingerprints from the received user information and transmit that information to a fingerprint server to do fingerprint lookups. The fingerprint server contains at least one copy of a registered fingerprint database. The registered fingerprint database comprises registered fingerprints generated from all of the organization's secure information. The fingerprint server and the protect agents communicate through a network to which they are connected. The network could either be a local network specific to the organization or could be the public internet. The network could also be a combination of the local network and the public internet.

In one embodiment, the fingerprint server receives client fingerprints transmitted by the protect agents. The fingerprint server does a lookup of the client fingerprints by comparing the client fingerprints against the registered fingerprints contained in the registered fingerprint database. The fingerprint server reports the results of the lookup by communicating the results of the comparison back to the protect agent that transmitted the client fingerprints. In one embodiment, the protect agent then initiates one or more security actions based on the results of the lookup.

An important feature of the present invention is that the registered fingerprints are maintained at a remote location (e.g., at the fingerprint servers connected to the network). This obviates the need to maintain numerous redundant copies of the registered fingerprints locally at the location of every protect agent. Maintaining remote central copies of the registered fingerprints also allows the registered fingerprint database to be updated and version controlled more efficiently.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

The present invention may be embodied in several forms and manners. The description provided below and the drawings show exemplary embodiments of the invention. Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

Figure 1:
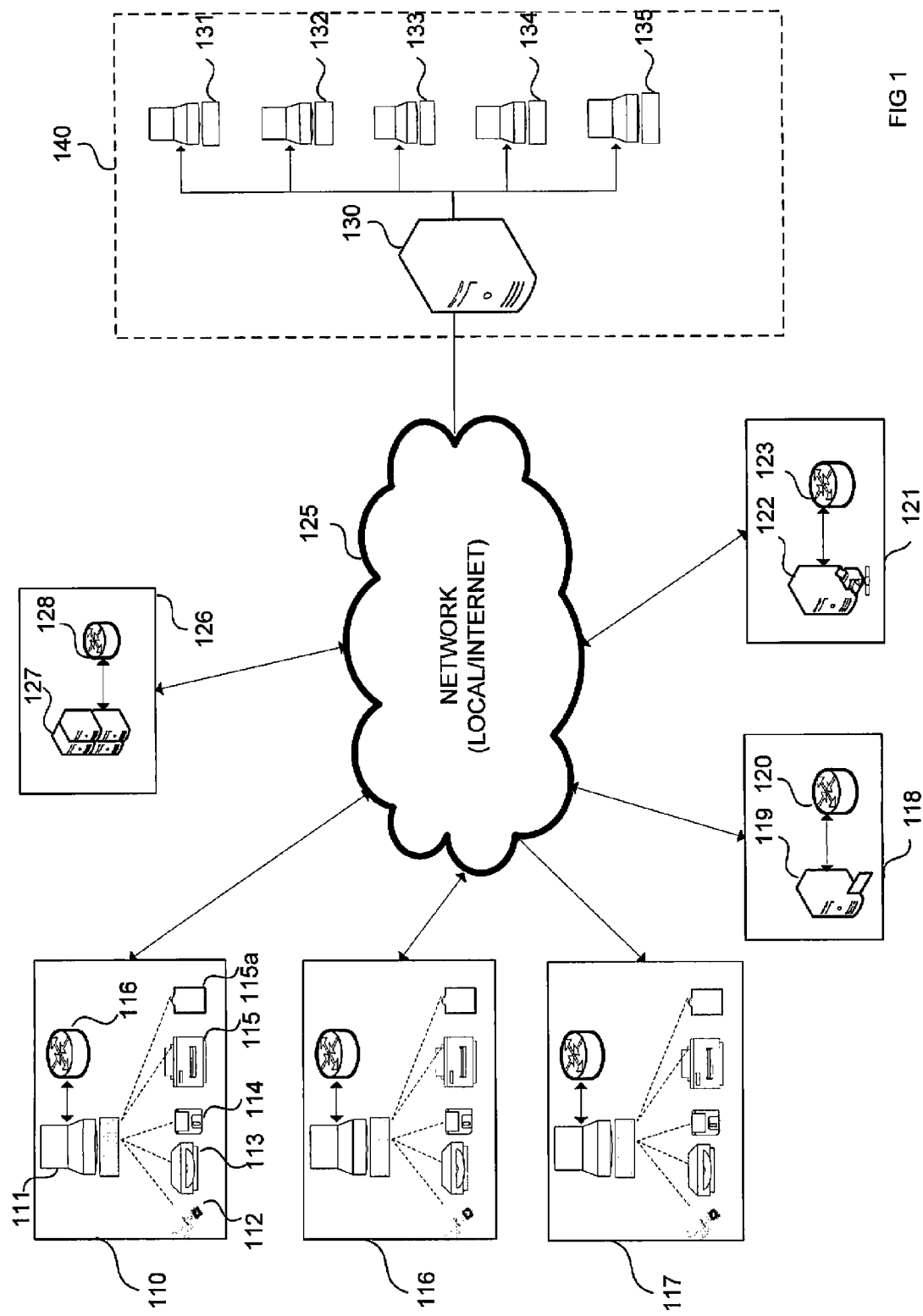
FIG. 1 illustrates an overall embodiment of a remote agent fingerprint lookup system.

FIG. 1 shows one example of an overall setup to implement remote agent lookups. One of the means by which a user can disclose digital information outside of the organization's perimeter is by disclosing the information through his computer system 110. Examples of such a computer system include a desktop computer, a laptop, a PDA or any such device that allows a user to access the organization's information. In one embodiment, the computing system 110 is connected to a network 125. Here, the computing system 110 comprises the desktop/laptop computer 111 through which the user accesses the organization's secure information. The user would be able to transfer information outside of the organization by transferring the information to any medium connected to the computer.

Such points at which information can be transferred outside of the organization's protected environment are called egress points. Examples of transferring data at egress points include copying the information from the computer to a CD disk 112 or any other optical storage medium, copying the information to a floppy drive 113 or any other tape medium, copying the information to a USB key 114 or other flash based storage medium, transferring the information by printing the information using a printer 115, copying information to the clipboard 115a of the local operating system, etc. In such an event, all the information that is transmitted through the computer 111 needs to be monitored to ensure that secure or sensitive information does not get transferred.

To achieve this purpose, the various egress points of the computer 111 are monitored to detect any activity that purports to disclose information through the egress points. A software agent, called the protect agent 116, is run on the computer 111 to monitor activity at the egress points (112, 113, 114, 115, 115a) associated with the computer 111. If the organization supports more than one computer system, each of these computer systems (110, 116, 117, 118) have protect agents installed on them to ensure that the activity on each of the computer systems is monitored. In one embodiment, the protect agent 116 is a set of computer instructions or a computer implemented program available on a memory location (e.g., on a magnetic tape drive, a flash memory drive, etc.) at the site of the protect agent 116.

In addition to being installed in every computer system (110, 116, 117, 118) in the network, the protect agents are also installed on other vulnerable egress points across the organization. One example of such a vulnerable egress point includes one or more email server systems 118 connected to the network. The email server 119 handles and routes the emails sent out and received by the organization. The protect agent 120 installed on the email server 119 monitors the emails desired to be sent out of the organization through the email server. Another example of a vulnerable egress point could be a print server 121 connected to the organization's network. A protect agent 123 connected to the print server 122 monitors print jobs sent by the users to the printers connected to the network.

Additional examples of vulnerable egress points include network appliance systems 126. Here, a protect agent 128 is installed in each network appliance 127 to ensure that information disclosed through a particular network appliance 127 is monitored. Examples of using network appliances 126 to transfer data include sharing of data over a network share medium, data transferred at the socket or TCP layer of the network, etc. It is understood that in addition to these examples, the egress points also include other porous environments through which information can be disclosed by the user beyond the secure environment of the organization.

The computer systems and all other systems representing egress points (the egress point systems) are centrally connected to a network 125. In one embodiment, the network includes a local network. This includes a network that is managed and maintained locally by the organization. In another embodiment, the network could also be the internet. In the case of the internet, each of the egress point systems could be directly and individually connected to the internet, or could be connected to a local network or a cluster of local networks, with each of the local networks communicating with each other through the internet. Other combinations of the egress point systems within the local network and the internet are possible and such combinations will be apparent to a person of skill in the art.

In the case of the public internet, the protect agents transmit fingerprint lookup requests to a hosted fingerprint server. A hosted fingerprint server is similar to the fingerprint server connected to a local network in that it contains at least one copy of the database of registered fingerprints (corresponding to the secure information of an organization). However, the difference is that the hosted fingerprint server is publicly accessible over the internet. One advantage of using a hosted fingerprint server is that an organization does not have to deploy and manage one or more server appliances within its networks. Some small organizations may not even have infrastructure to maintain a network and host a fingerprint server, but may still require their secure information to be protected. In such cases, the support and manageability of the fingerprint server can be done by even a third party provider who provides the service of a hosted fingerprint server.

A hosted fingerprint service enables protect agents to behave consistently in mobile environments, with the same fingerprint lookups happening inside and outside of the organization. For example, a laptop user can be blocked from emailing confidential files while using a wireless internet connection in a café. In this case, the protect agent can still communicate with the publicly accessible hosted fingerprint service. A provider offering a hosted fingerprint service can also support multi-tenancy services, whereby the provider shares the hosted fingerprint server's resources across different organizations and cutting down on costs. In one embodiment, this would allow fingerprint databases for multiple organizations to reside on the same server.

FIG. 1 illustrates a plurality of fingerprint servers (131-135) connected to the network. In one embodiment, the protect agent located at each of the egress points collect the information that the user intends to disclose and transmit such information to the fingerprint server domain 140. One embodiment of the fingerprint server domain 140 includes one or more fingerprint servers directly connected to the network (not shown in FIG. 1), such that it directly receives the information transmitted by each protect agent. In another embodiment, one or more fingerprint servers (131-135) are connected to a fingerprint server router 130, such that more protect agents can be served with improved efficiency and reduced latency. The fingerprint server router 130 is connected to the network and serves as the gatekeeper for all the information received from the various protect agents through the network 125.

One of the functions of the fingerprint server router 130 is to collect performance and logistics information from each of the fingerprint servers and route any information received from the protect agents to the fingerprint server that is least busy. In one embodiment, the fingerprint servers could be located at different geographical locations (not shown in FIG. 1) and connect to the fingerprint server router 130 through the network. This distributed model would allow organizations to run protect agents with minimal performance lag across geographically diverse locations, such that information from the protect agents are routed to the most optimal fingerprint server.

Regardless of whether a single fingerprint server is used or a suite of fingerprint servers are used, every fingerprint server contains at least one fingerprint database. The fingerprint data base is a repository of fingerprints representing the secure information that the organization intends to protect. In one embodiment, the fingerprint server router 130 is responsible for keeping the redundant fingerprint databases in every fingerprint server up to date. It should be noted that the fingerprint server router is not imperative to maintaining a distributed fingerprint server array. Any other means known in the art through which a distributed network can be achieved can be employed in the place of the fingerprint server router 130. More information on fingerprints and the generation of fingerprints is provided further below.

Figure 2:
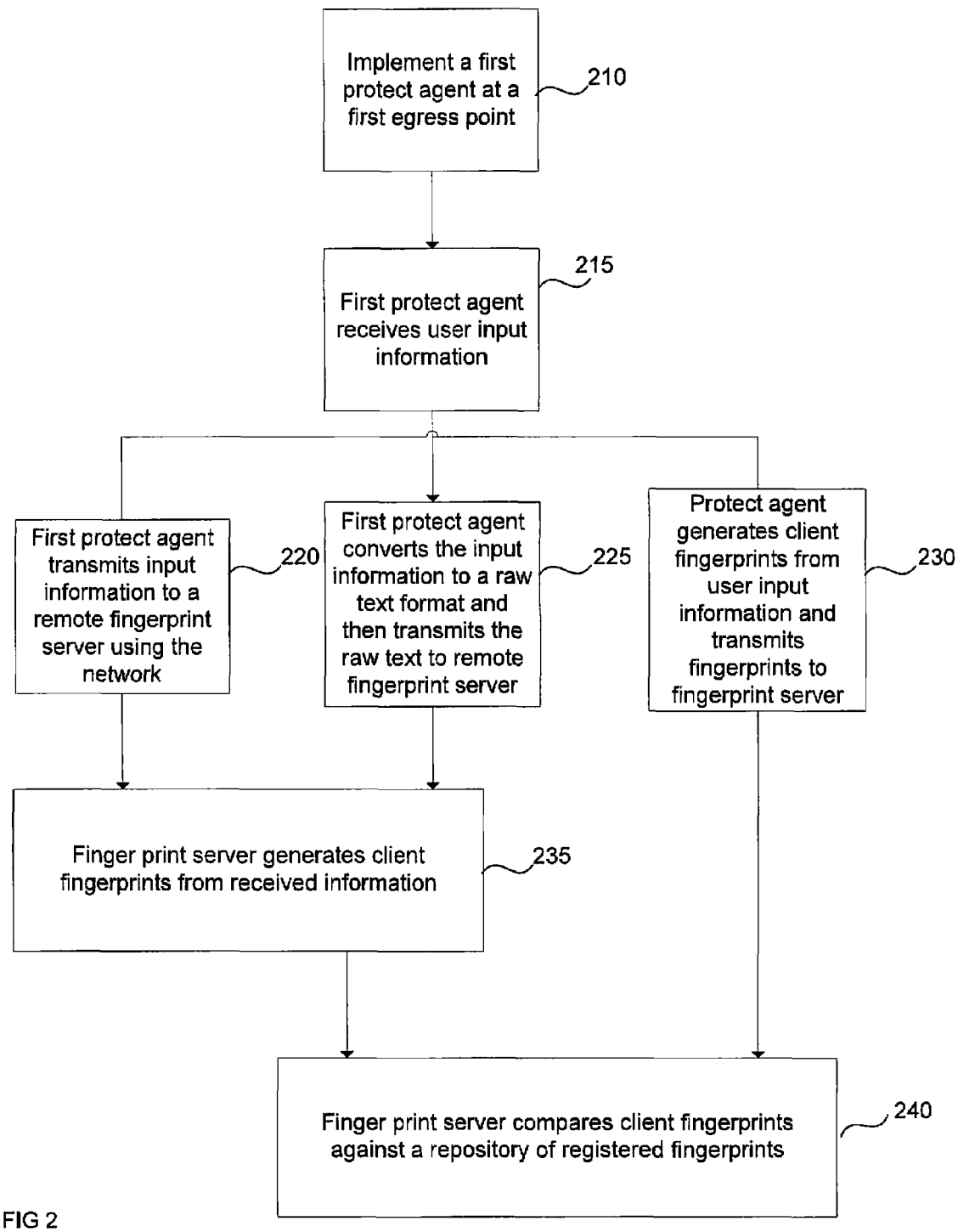
FIG. 2 is a flowchart depicting one embodiment of a method to achieve fingerprinting across remote agents.

FIG. 2 is a flowchart depicting one embodiment of a method to achieve fingerprinting across remote agents. In this method, a protect agent is first installed 210 at the location of the various egress points. As discussed above, some examples of where the protect agent could be installed include a desktop computer, a print server, an email server, etc. In one embodiment, the protect agent is a set of instructions or software modules copied to a physical memory on the egress point location. Examples of the physical memory include magnetic tapes, optical disks, flash memory devices, etc. Once the protect agent is installed at a particular egress point location, it monitors all the activity at that particular egress point. For example, a protect agent installed on a desktop computer would monitor all print jobs sent by the user to a printer directly attached to the desktop computer. In the course of monitoring the activity at egress points, the protect agent receives the information 215 that the user intends to disclose through one of the egress points.

The protect agent then transmits the user input information to the fingerprint server connected to the network. The protect agent transmits this information through the network. In one embodiment, the mechanism through which the protect agent and the fingerprint server communicate includes web service calls. Using the web service call standard or a similar standard (as understood by people skilled in the art) allows interoperability between different operating systems and computer language environments. These standards also allow the fingerprint lookups to operate as a service that can be published and integrated with third-parties. As indicated above, the network could either be a local network maintained by the organization, or could be the public internet, or a combination of the local network and the public internet.

The information transmitted by the protect agent to the fingerprint server could be in several formats. In one embodiment, the protect agent directly transmits the digital information 220 that the user intends to disclose. Examples of such digital information include text files, audio files, video files, etc. These examples also include other forms of data, such as software code, design data (e.g., VLSI or CAD design files), or any other digital form of data that an organization wishes to protect. In such cases, the protect agent transmits the information as-is, or encrypts the files before transmission to ensure the security of the transmitted information. The encryption can be done with any of the standard encryption algorithms known to people skilled in the art.

In another embodiment, the protect agent converts the information received from the user to a raw text format 225 before transmission to the fingerprint server. One advantage of converting the files to raw text is that it decreases the size of the file being sent over, thus reducing network congestion and file lookup latency. Additionally, processing the files at the site of the protect agents relieves the fingerprint server of some of the computational burden from handling the user input information received from all protect agents. The protect agents may additionally encrypt the raw text before transmission. There are several methods widely known in the field of art to convert a digital file to raw text. One such method is described in the U.S. application Ser. No. 12/177,043, describing how a digital text file can be converted to raw text.

In one other embodiment, the protect agent converts the digital information to fingerprints 230 before transmission to the fingerprint server. Fingerprinting the information helps achieve a file size reduction, thus ensuring the advantages of reducing network congestion and lookup latency. The fingerprint servers are also freed up from the task of generating fingerprints, and therefore are relieved from the computational burden imposed by the several protect agents they communicate with. Additionally, because the fingerprints inherently add security to the information being transmitted, this method obviates the need for additional encryption of the transmitted files. There are several methods widely known in the field of art to generate fingerprints from digital information. One such method is described in the U.S. application Ser. No. 12/177,043, providing how fingerprints are generated from digital text information.

The fingerprint server receives the information transmitted by the protect agent. If the information received is not in the form of fingerprints, the fingerprint server generates the fingerprints after receiving the information from the protect agent. Otherwise, the received fingerprints are used as-is. The fingerprint server, as discussed above, contains a database of fingerprints that represent the secure information for a particular organization. The fingerprint server is primarily a computer capable of performing arithmetic and logic operations. The fingerprint server compares the fingerprints associated with the user input information (the client fingerprints) with the fingerprints contained in the fingerprint server 235. Based on the results of the comparison, the fingerprint server generates a comparison analysis and transmits this analysis back to the protect agent 240. The fingerprint server contains a set of instructions or suitable software available in one of its memory locations to perform the comparison analysis. After completing the comparison analysis, the fingerprint server transmits the data to the protect agent utilizing the network.

Figure 3:
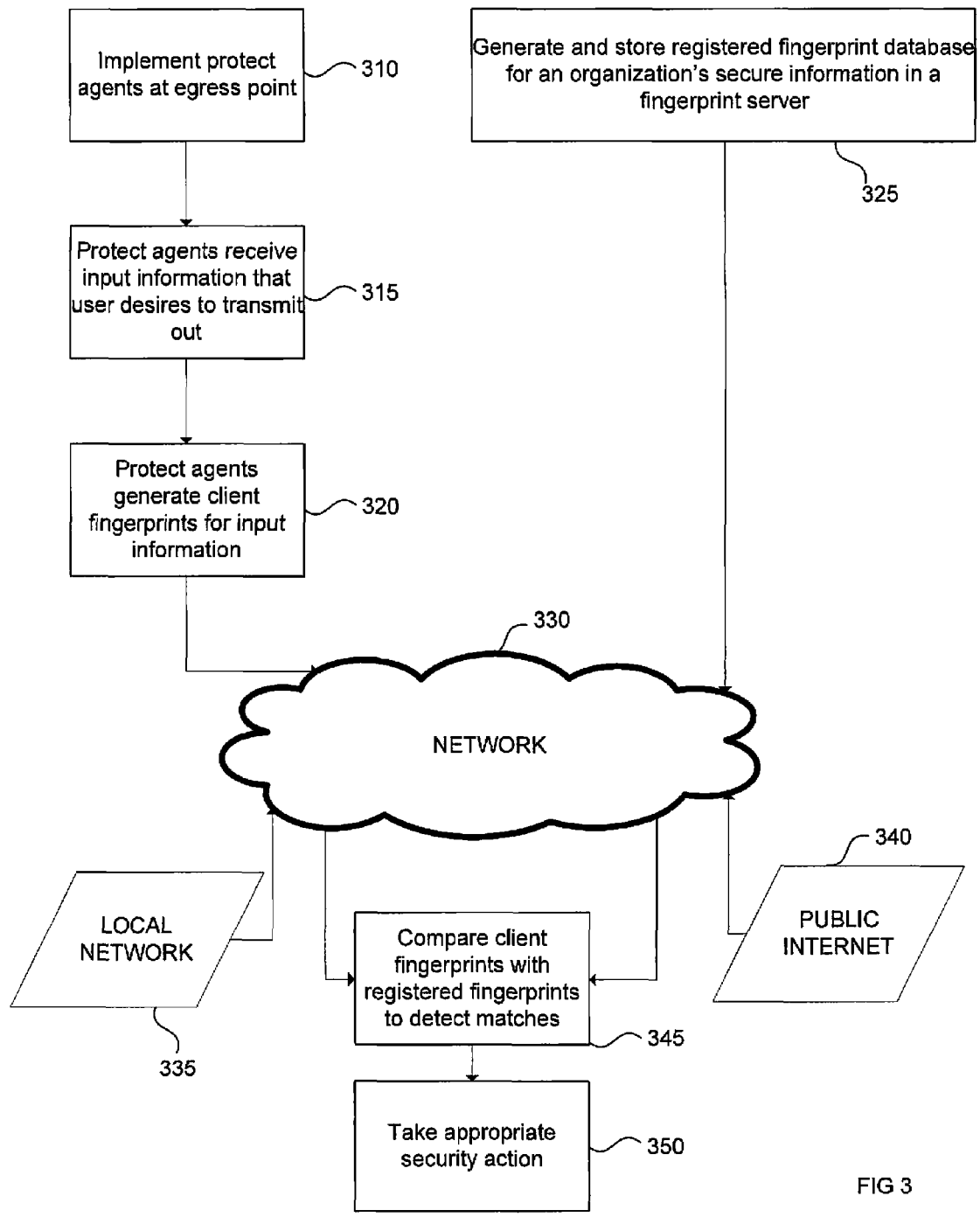
FIG. 3 is a flowchart illustrating a method to use remote agent lookups for the purpose of taking appropriate security actions.

FIG. 3 is a flowchart depicting another embodiment of a method to achieve fingerprinting across remote agents. Here, protect agents are first installed at various egress point locations 310. The protect agents residing at the location of the egress points receive the information a user intends to disclose through those particular egress points 315. In one embodiment, the protect agent generates fingerprints from information that the user desires to disclose 315. After generating the fingerprints, the protect agent transmits the fingerprints to the fingerprint server, utilizing the network 330. The network, as discussed above, could either be a local network 335 or the public internet 340.

The fingerprint server is at a location remote from the protect agents. This fingerprint server contains a database of registered fingerprints 325. The registered fingerprints represent the secure digital information of a particular organization. The fingerprint server receives the fingerprints transmitted by the protect agents (the client fingerprints), and compares the received fingerprints with the registered fingerprints 345. The fingerprint server then transmits the results of the comparison back to the protect agent. If the protect agent receives information that one or more client fingerprints match the registered fingerprints, it takes an appropriate security action 350. Some examples of the security action include preventing the information from being transmitted out through the associated egress point, sending out a security alert to a system administrator, revoking the user's access to the particular information, alerting the user of the security violation, etc. The security actions may also include integration with third party software to offer security solutions (e.g., integration with Microsoft Windows® RMS to apply rights management to the information being disclosed). It is understood that these examples of security actions are used for illustrative purposes only, and that other security actions known to people skilled in the art are equally applicable here.

Figure 4:
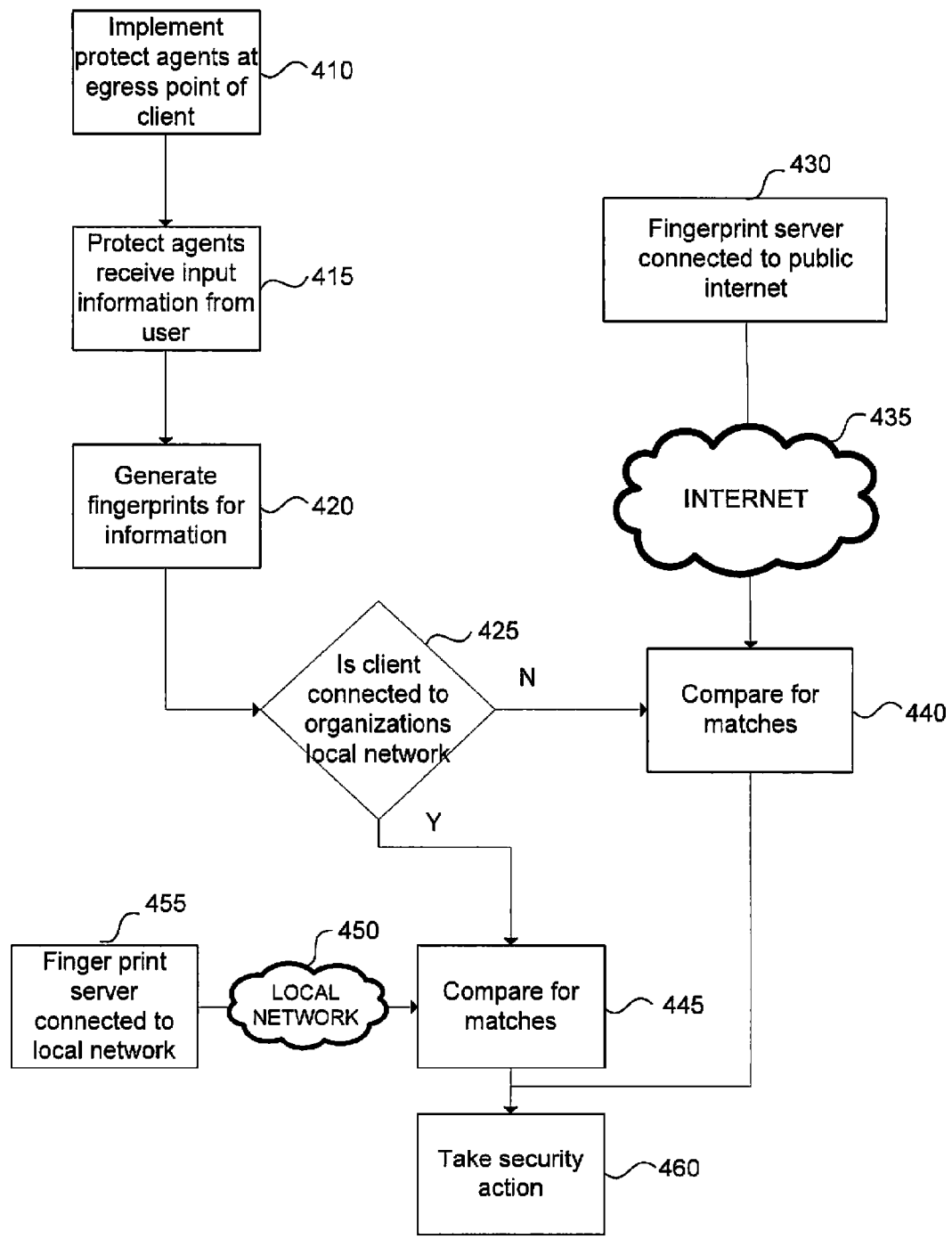
FIG. 4 is a flowchart depicting an embodiment of a combined remote agent lookup method, where a combination of a local network and the public internet is utilized for remote lookups.

FIG. 4 is a flowchart depicting an embodiment of a combined network, where a combination of a local network and the public internet is utilized by the remote protect agents. Here, the protect agents are installed at every egress point at the client side 410. The protect agents monitor activity on the client, and receive information that a user intends to disclose outside of the organization through one of the egress points 415. In one embodiment, the protect agents generate fingerprints from the digital information input by the user 420. Redundant copies of the fingerprint database are maintained on several fingerprint serves such that at least one fingerprint server is connected to the local network 455, 450, and at least one fingerprint server is available as a hosted service connected to the internet 430, 435.

In one implementation of the embodiment, the protect agent determines whether the client is connected to a local network 425. If the protect agent determines that the client is connected to the local network, it transmits the fingerprints to the fingerprint server connected to the local network. The fingerprint server connected to the local network compares the fingerprints received from the client against the registered fingerprints contained in the fingerprint server 445. On the other hand, if the protect agent determines that the client is not connected to the local network (e.g., when the user uses his laptop computer from a public café), the fingerprints corresponding to information he attempts to disclose are transmitted to the hosted fingerprint server connected to the internet. This hosted fingerprint server compares the client fingerprints against the registered fingerprints to determine if there are any matches 445. If a match is detected by either fingerprint server, a suitable security action is taken 460.

The systems explained above and associated embodiments relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system.

The algorithms and software presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from other portions of this description. In addition, the present invention is not described with reference to any particular programming language, and various embodiments may thus be implemented using a variety of programming languages.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A computer implemented method for protecting an organization's secure information from unauthorized disclosure outside of an organization's protected computer environment, said environment comprised of at least one computing device, using at least one instances of a protect agent installed and operating on the at least one computing devices, the computer implemented method comprising:

monitoring, by the at least one protect agents operating on the at least one computing devices, the activity of each of an at least one computing device egress points;

determining, by the at least one protect agent operating on the at least one computing device, an attempt by the computing device to transmit a data file outside the monitored organization's protected computer environment using one of the at least one egress points;

based on a determination, by the protect agent operating on the computing device, of an attempt by the computing device to transmit the data file outside the monitored organization's protected computer environment, transmitting the data file to a fingerprint server prior to the data file being transmitted to the determined destination outside of the organization's protected computer environment;

receiving, by the fingerprint server, the data file transmitted by the protect agent operating on the computing device;

converting, by the fingerprint server, a portion of the information contained in the transmitted data file to at least one fingerprints representative of the information contained in the data file;

determining, by the fingerprint server, whether the at least one fingerprint matches at least one of a plurality of preexisting fingerprints residing in a database of fingerprints accessible to the fingerprint server;

based on a determination, of a match, selecting a security action associated with the matched fingerprint; and transmitting, by the fingerprint server, to the protect agent operating on the computing device, a data representing the security action selected by the fingerprint server.

2. A computer implemented method for protecting an organization's secure information from unauthorized disclosure as recited in claim 1, wherein the one of the at least one egress points is a printer.

3. A computer implemented method for protecting an organization's secure information from unauthorized disclosure as recited in claim 1, wherein the one of the at least one egress points is a removable data storage medium.

4. A computer implemented method for protecting an organization's secure information from unauthorized disclosure as recited in claim 1, wherein the one of the at least one egress points is an email server connected to the network.

5. A computer implemented method for protecting an organization's secure information from unauthorized disclosure as recited in claim 1, wherein the one of the at least one egress points is a print server connected to the network.

6. A computer implemented method for protecting an organization's secure information from unauthorized disclosure as recited in claim 1, wherein the one of the at least one egress points is a network appliance connected to the network.

7. A computer implemented method for protecting an organization's secure information from unauthorized disclosure as recited in claim 1, wherein the one of the at least one egress points is a data object residing in the computing device, said data object representing a portion of a document file selected by the user using a clipboard associated with a local operating system.

8. A computer implemented method for protecting an organization's secure information from unauthorized disclosure as recited in claim 1, further comprising:

adding to the data file, by the protect agent, data comprising the data representing the security action.

9. A computer implemented method for protecting an organization's secure information from unauthorized disclosure as recited in claim 8, further comprising: encrypting the data file prior to the transmission to the fingerprint server.

10. A computer implemented method for protecting an organization's secure information from unauthorized disclosure as recited in claim 1, wherein the environment includes a local network associated with the organization.

11. A computer implemented method for protecting an organization's secure information from unauthorized disclosure as recited in claim 10, wherein the network includes a public internet.

12. A computer implemented method for protecting an organization's secure information from unauthorized disclosure as recited in claim 11, wherein the fingerprint server is hosted and maintained by a hosted fingerprint service provider.

13. A computer implemented method for protecting an organization's secure information from unauthorized disclosure as recited in claim 11, wherein the network further includes a public internet.

14. A computer implemented method for protecting an organization's secure information from unauthorized disclosure as recited in claim 1, the computer implemented method further comprising: maintaining a plurality of fingerprint servers, wherein each of the plurality of the fingerprint servers includes the database of preexisting fingerprints.

15. A computer implemented method for protecting an organization's secure information from unauthorized disclosure as recited in claim 14, wherein the plurality of fingerprint servers are connected to the network.

16. A computer implemented method for protecting an organization's secure information from unauthorized disclosure as recited in claim 14, further comprising: selecting the fingerprint server to receive the data file in dependence on a load distribution.

17. A computer implemented method for protecting an organization's secure information from unauthorized disclosure as recited in claim 14, wherein one or more of the plurality of fingerprint servers are located in geographically diverse locations.

18. A computer implemented method for protecting an organization's secure information from unauthorized disclosure as recited in claim 1, wherein communication between the protect agent and the fingerprint server is by means of web service calls.

19. A computer implemented method for protecting an organization's secure information from unauthorized disclosure as recited in claim 1, further comprising:

storing in memory on the computing device operating the protect agent at least one of the preexisting fingerprints and associated security actions, wherein the protect agent converts the data file to a fingerprint and attempts to match the converted fingerprint against the at least one preexisting fingerprints stored in memory, and in dependence on a match, selecting a security action associated with the matched preexisting fingerprint and not executing the transmitting step to the fingerprint server.

20. A computer implemented system for protecting an organization's secure information from unauthorized disclosure, the computer implemented system comprising:
- an at least one processor within a corresponding an at least one computing device;
- an at least one corresponding non-transitory memory in the corresponding at least one processors storing code which, when executed by the at least one processor on the at least one computing device, causes the at least one processor on the computing device to perform the steps of:
- monitoring the activity of each of an at least one computing system device egress points;
- determining an attempt by the at least one computing device to transmit a data file outside at least one of the egress points;
- based on a determination of an attempt by the computing device to transmit the data file outside the at least one egress points, transmitting the data file to a fingerprint server prior to the data file being transmitted outside the at least one egress points;
- a processor on a fingerprint server;
- a non-transitory memory comprising the fingerprint server for storing code which, when executed by the processor on the fingerprint server, causes the processor on the fingerprint server to perform the steps of:
- receiving the data file transmitted by the protect agent operating on the computing device;
- converting a portion of the information contained in the transmitted data file to at least one fingerprints representative of the information contained in the data file;
- determining whether the at least one fingerprint matches at least one of a plurality of preexisting fingerprints residing in a database of fingerprints accessible to the fingerprint server;
- based on a determination of a match, selecting a security action; and
- transmitting to the protect agent operating on the computing device, a data representing the security action selected by the fingerprint server.

21. A computer implemented system for protecting an organization's secure information from unauthorized disclosure as recited in claim 20, wherein the one of the at least one egress points is at least one of: a printer; a removable data storage medium; a clipboard associated with a local operating system; an email server connected to the network; a print server connected to the network; or a network appliance connected to the network.

22. A computer implemented system for protecting an organization's secure information from unauthorized disclosure as recited in claim 20, wherein the security action is comprised of encrypting the digital data prior to transmission to the fingerprint server.

23. A computer implemented system for protecting an organization's secure information from unauthorized disclosure as recited in claim 20, wherein the network includes a local network.

24. A computer implemented system for protecting an organization's secure information from unauthorized disclosure as recited in claim 23, wherein the network further includes a public internet.

25. The method of claim 1 where:
- there is no step of transmitting the data file to the fingerprint server and instead there is the step of transmitting to the fingerprint server a fingerprint derived from the data that is generated on the computing device; and
- there is no step of receiving by the fingerprint server the data file nor the step of converting on the fingerprint server the data file into the fingerprint and instead the receiving by the fingerprint server step is the step of receiving by the fingerprint server the transmitted fingerprint.

26. The system of claim 20 where
- there is no step of transmitting the data file to the fingerprint server and instead there is the step of transmitting to the fingerprint server a fingerprint derived from the data that is generated on the computing device; and
- there is no step of receiving by the fingerprint server the data file nor the step of converting on the fingerprint server the data file into the fingerprint and instead the receiving by the fingerprint server step is the step of receiving by the fingerprint server the transmitted fingerprint.

* * * * *